(12) United States Patent
Sawada et al.

(10) Patent No.: US 11,393,215 B2
(45) Date of Patent: Jul. 19, 2022

(54) RESCUE SYSTEM AND RESCUE METHOD, AND SERVER USED FOR RESCUE SYSTEM AND RESCUE METHOD

(71) Applicant: TOYOTA JIDOSHA KABUSHIKI KAISHA, Toyota (JP)

(72) Inventors: Hiroki Sawada, Toyota (JP); Masato Tamaoki, Iwakura (JP); Eisuke Ando, Nagoya (JP); Masato Endo, Nagakute (JP); Kuniaki Hasegawa, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/188,752

(22) Filed: Nov. 13, 2018

(65) Prior Publication Data
US 2019/0147252 A1    May 16, 2019

(30) Foreign Application Priority Data

Nov. 13, 2017 (JP) .............................. JP2017-218372

(51) Int. Cl.
*G06V 20/56* (2022.01)
*G08B 21/22* (2006.01)
(Continued)

(52) U.S. Cl.
CPC .............. *G06V 20/56* (2022.01); *B60K 35/00* (2013.01); *B60R 11/04* (2013.01); *B64C 39/024* (2013.01);
(Continued)

(58) Field of Classification Search
CPC ...... H04N 7/181; H04W 4/029; H04W 12/06; H04W 4/046; H04W 12/08; H04W 4/90;
(Continued)

(56) References Cited

U.S. PATENT DOCUMENTS 8,086,351 B2   12/2011   Gaudiano et al.
9,471,059 B1   10/2016   Wilkins
(Continued)

FOREIGN PATENT DOCUMENTS

CN   1798335 A      7/2006
CN   103426211 A    12/2013
(Continued)

OTHER PUBLICATIONS

United States Patent and Trademark Office, Non-Final Office Action issued to U.S. Appl. No. 16/189,092 dated Aug. 15, 2019, 31 pages.
(Continued)

*Primary Examiner* — Farhan Mahmud
(74) *Attorney, Agent, or Firm* — Hunton Andrews Kurth LLP

(57) ABSTRACT

A rescue system identifies and rescues a protection target, using information from a camera mounted on a movable body. The rescue system includes: a plurality of movable bodies; and a server configured to communicate with the plurality of movable bodies. The server is configured, when the protection target is identified, to (a) acquire positional information about each of the plurality of movable bodies and positional information about the protection target, and (b) select, as the protection target moves, a movable body which is to monitor the protection target, from the plurality of movable bodies.

11 Claims, 8 Drawing Sheets

(51) Int. Cl.
    *B60R 11/04*     (2006.01)
    *B60K 35/00*     (2006.01)
    *B64C 39/02*     (2006.01)
    *G05D 1/00*     (2006.01)
    *G06V 20/52*     (2022.01)
    *G08B 13/196*     (2006.01)

(52) U.S. Cl.
    CPC ........... *G05D 1/0088* (2013.01); *G06V 20/52* (2022.01); *G08B 21/22* (2013.01); *B60K 2370/152* (2019.05); *B60K 2370/797* (2019.05); *B64C 2201/127* (2013.01); *B64C 2201/141* (2013.01); *G05D 2201/0213* (2013.01); *G08B 13/1965* (2013.01)

(58) Field of Classification Search
    CPC .......... H04W 4/40; H04L 67/12; G07C 5/008; G01C 21/26; G01C 21/3647; G06F 3/017; G06F 3/04842; G06Q 30/02; G08G 1/096775; G08G 1/205; B60R 25/102; G08B 25/016
    See application file for complete search history.

(56) References Cited

U.S. PATENT DOCUMENTS

| | | | |
|---|---|---|---|
| 9,648,107 B1 * | 5/2017 | Penilla | H04L 67/12 |
| 9,826,415 B1 | 11/2017 | Byrne | |
| 10,155,587 B1 | 12/2018 | Tang | |
| 10,395,332 B1 | 8/2019 | Konrardy et al. | |
| 2002/0156646 A1 | 10/2002 | Kaiwa et al. | |
| 2004/0233414 A1 | 11/2004 | Jamieson et al. | |
| 2006/0066723 A1 | 3/2006 | Iwase et al. | |
| 2006/0152592 A1 | 7/2006 | Chishima et al. | |
| 2006/0184323 A1 | 8/2006 | Park | |
| 2006/0187027 A1 | 8/2006 | Smith | |
| 2007/0205937 A1 | 9/2007 | Thompson et al. | |
| 2008/0077322 A1 | 3/2008 | Sumizawa | |
| 2009/0204600 A1 | 8/2009 | Kalik et al. | |
| 2010/0198514 A1 | 8/2010 | Miralles | |
| 2010/0262367 A1 | 10/2010 | Riggins et al. | |
| 2011/0066368 A1 | 3/2011 | Koyasu et al. | |
| 2012/0316768 A1 | 12/2012 | Haran | |
| 2013/0002869 A1 | 1/2013 | Yuasa et al. | |
| 2013/0178185 A1 | 7/2013 | Park et al. | |
| 2013/0194421 A1 | 8/2013 | Kita | |
| 2013/0217332 A1 | 8/2013 | Altman et al. | |
| 2014/0111332 A1 | 4/2014 | Przybylko et al. | |
| 2014/0133656 A1 | 5/2014 | Wurster et al. | |
| 2014/0167954 A1 | 6/2014 | Johnson et al. | |
| 2014/0309866 A1 * | 10/2014 | Ricci | G06Q 30/0633 701/36 |
| 2014/0353422 A1 | 12/2014 | Westbrook, Sr. | |
| 2015/0066248 A1 | 3/2015 | Arbeit et al. | |
| 2015/0194034 A1 | 7/2015 | Shim et al. | |
| 2016/0340006 A1 | 11/2016 | Tang | |
| 2017/0034682 A1 | 2/2017 | Matsumasa et al. | |
| 2017/0041743 A1 | 2/2017 | Artzt et al. | |
| 2017/0092109 A1 | 3/2017 | Trundle et al. | |
| 2017/0131727 A1 | 5/2017 | Kurdi et al. | |
| 2017/0191843 A1 | 7/2017 | Yadav | |
| 2017/0249846 A1 | 8/2017 | Ignaczak et al. | |
| 2017/0301109 A1 | 10/2017 | Chan et al. | |
| 2017/0364733 A1 | 12/2017 | Estrada et al. | |
| 2018/0039262 A1 | 2/2018 | Fox et al. | |
| 2018/0050800 A1 | 2/2018 | Boykin et al. | |
| 2018/0068546 A1 | 3/2018 | Fujimoto | |
| 2018/0082560 A1 | 3/2018 | Gillum et al. | |
| 2018/0096579 A1 * | 4/2018 | Komatsu | G06K 7/10 |
| 2018/0128894 A1 | 5/2018 | Kaio | |
| 2018/0249127 A1 | 8/2018 | Sielski et al. | |
| 2018/0300964 A1 * | 10/2018 | Lakshamanan | G07C 5/008 |
| 2019/0057252 A1 | 2/2019 | Ichihara et al. | |
| 2019/0086914 A1 | 3/2019 | Yen et al. | |
| 2019/0141948 A1 | 5/2019 | Sawada et al. | |
| 2019/0147720 A1 | 5/2019 | Sawada et al. | |
| 2019/0147723 A1 | 5/2019 | Sawada et al. | |

FOREIGN PATENT DOCUMENTS

| | | |
|---|---|---|
| CN | 103956059 A | 7/2014 |
| CN | 207218924 U | 4/2018 |
| JP | H09-220266 A | 8/1997 |
| JP | 2000099971 A | 4/2000 |
| JP | 2003109156 A | 4/2003 |
| JP | 2005038299 A | 2/2005 |
| JP | 2005-092727 A | 4/2005 |
| JP | 2006086591 A | 3/2006 |
| JP | 2009064222 A | 3/2009 |
| JP | 2013-157019 A | 8/2013 |
| JP | 2015-111906 A | 6/2015 |
| JP | 2016036123 A | 3/2016 |
| JP | 2016119625 A | 6/2016 |
| JP | 2016-218865 A | 12/2016 |
| JP | 2017027107 A | 2/2017 |
| JP | 2017126967 A | 7/2017 |
| JP | 2017163511 A | 9/2017 |
| KR | 20160026437 A | 3/2016 |
| KR | 1020170100892 A | 9/2017 |
| SG | 195504 A1 | 12/2013 |
| WO | 2016132492 A1 | 8/2016 |
| WO | 2016162899 A1 | 10/2016 |
| WO | 2017119505 A1 | 7/2017 |
| WO | 2017154595 A1 | 9/2017 |
| WO | 2017159680 A1 | 9/2017 |

OTHER PUBLICATIONS

United States Patent and Trademark Office, Final Office Action issued to U.S. Appl. No. 16/189,092 dated Jun. 30, 2020, 49 pages.
United States Patent and Trademark Office, Non-Final Office Action issued to U.S. Appl. No. 16/189,092 dated Nov. 17, 2020, 39 pages.
Notice of Allowance, United States Patent and Trademark Office, issued to U.S. Appl. No. 16/189,092 dated Mar. 10, 2021, 20 pages.
Corrected Notice of Allowance, United States Patent and Trademark Office, issued to U.S. Appl. No. 16/189,092 dated Mar. 29, 2021, 6 pages.
Corrected Notice of Allowability, United States Patent and Trademark Office, issued to U.S. Appl. No. 16/189,092 dated Apr. 8, 2021, 6 pages.
Corrected Notice of Allowability, United States Patent and Trademark Office, issued to U.S. Appl. No. 16/189,092 dated May 26, 2021, 6 pages.
Corrected Notice of Allowability, United States Patent and Trademark Office, issued to U.S. Appl. No. 16/189,092 dated Jun. 3, 2021, 6 pages.
Corrected Notice of Allowance, United States Patent and Trademark Office, issued to U.S. Appl. No. 16/189,092 dated Jul. 29, 2021, 6 pages.

* cited by examiner

RESCUE SYSTEM AND RESCUE METHOD, AND SERVER USED FOR RESCUE SYSTEM AND RESCUE METHOD

This nonprovisional application is based on Japanese Patent Application No. 2017-218372 filed on Nov. 13, 2017 with the Japan Patent Office, the entire contents of which are hereby incorporated by reference.

BACKGROUND

Field

The present disclosure relates to a rescue system and a rescue method as well as a server used for the rescue system and the rescue method, and more particularly relates to a system using a vehicle to detect a person to be protected (protection target) who is absent without leave, so as to protect the person.

Description of the Background Art

Recently, with the aging of the society, the number of elderly people suffering from diseases and symptoms such as dementia has been increasing. Dementia patients who are cared for at home may leave home without permission while the caregiver is absent to eventually go missing or suffer an accident, for example.

A system for searching for such an elderly person or lost child for example has been known. For example, Japanese Patent Laying-Open No. 2015-111906 discloses a search system for determining whether a person whose image is captured by a camera is a search target, based on images and/or video captured by a plurality of cameras connected to a network such as monitoring cameras installed on streets and moving cameras mounted on movable bodies like vehicles, and also based on text information derived from a name tag or the like shown on the images.

Japanese Patent Laying-Open No. 2016-218865 discloses a rescue system for identifying a user such as dementia patient based on a serial number on an accessory worn by the user. The serial number is read by a smart phone or the like of a finder of the user and transmitted to a data management company from the smart phone.

SUMMARY

The search system disclosed in above-referenced Japanese Patent Laying-Open No. 2015-111906 identifies the search target (protection target) based on image information from cameras and text information acquired from the image information, and locates the search target based on positional information about the cameras transmitted together with the image information.

As for a stationary camera like monitoring camera, however, the search target who is moving may go out of the field of view of the stationary camera. As for a moving camera like car-mounted camera, the camera-mounted movable body itself moves, and therefore, the search target who is stopping may also go out of the field of view of the moving camera. Therefore, even when the search target is detected, the system may not be able to appropriately keep monitoring the search target to eventually lose sight of the search target.

The present disclosure is given to provide solutions to the above problems. An object of the present disclosure is to keep monitoring an identified person to be protected (hereinafter referred to as "protection target"), by a system for identifying and rescuing the protection target, based on information from a camera mounted on a movable body.

A rescue system according to the present disclosure is a system for identifying and rescuing a protection target, using information from a camera. The rescue system includes: a plurality of movable bodies each equipped with a camera; and a server configured to communicate with the plurality of movable bodies. The server is configured to identify the protection target, using information from the plurality of movable bodies. The server is configured, when the protection target is identified, to (a) acquire positional information about each of the plurality of movable bodies and positional information about the protection target, and (b) select, as the protection target moves, a movable body which is to monitor the protection target, from the plurality of movable bodies.

When a protection target is identified, the rescue system of the present disclosure acquires positional information about the protection target and positional information about peripheral movable bodies (e.g. vehicles) and, as the protection target moves, the rescue system selects a movable body which is to take over monitoring of the protection target, based on the positional information. Therefore, even when the protection target or the movable body moves and the protection target goes out of the field of view of the movable body which found the protection target, the system can keep monitoring the protection target.

The plurality of movable bodies include a first movable body and a second movable body. The server is configured, while the first movable body is monitoring the protection target, to (a) predict a moving direction in which the protection target moves, from the positional information about the protection target, and (b) switch the movable body to be used for monitoring the protection target, from the first movable body to the second movable body, when the second movable body is located in the predicted moving direction.

In the system thus configured, a movable body located in the direction in which the protection target moves can appropriately take over monitoring. The system is thus prevented from losing sight of the protection target due to movement of the protection target.

The plurality of movable bodies include a first movable body and a second movable body. The first movable body and the second movable body are configured to communicate with each other. When the protection target goes out of a detectable range of the camera of the first movable body while the first movable body is monitoring the protection target, the first movable body requests the second movable body to take over monitoring of the protection target.

In the system thus configured, it is possible to take over monitoring through inter-mobile communication without the server. Accordingly, it is possible to more smoothly take over monitoring as compared with selection of a movable body through the server.

The plurality of movable bodies include a vehicle configured to perform automated driving. The vehicle is configured, when the vehicle detects the protection target, to track the protection target by automated driving, as the protection target moves.

In the system thus configured, when the movable body conducting search is a vehicle capable of automated driving, it is possible to track the protection target by this vehicle. When the vehicle used for monitoring is switched from one vehicle to another vehicle and respective fields of view of these two vehicles do not overlap each other, the system may lose sight of the protection target when the vehicle used for monitoring is switched from one vehicle to the other. In view of this, the vehicle which recognized the protection target tracks the protection target by automated driving, and thus the system can be prevented from losing sight of the protection target.

The vehicle includes a display formed in a window of the vehicle. The vehicle is configured to provide information to the protection target through the display while the vehicle is tracking the protection target by automated driving.

The display is configured to serve as an interface enabling a protector of the protection target to make a conversation with the protection target, while the vehicle is tracking the protection target.

In the system thus configured, it is possible to recognize the situations/conditions of the protection target, through the display of the vehicle while the protection target is tracked by automated driving, and it is also possible to guide the protection target to a safe place and/or provide required information. Moreover, it is possible for a family member of the protection target or a staff member of a rescue group (protector) to directly talk with the protection target through the display. Accordingly, the protection target can be appropriately protected.

The vehicle is provided with an air vehicle equipped with a camera and capable of automated flight. When the protection target enters an area in which the vehicle cannot track the protection target while the vehicle is tracking the protection target, the vehicle actuates the air vehicle and the air vehicle takes over monitoring of the protection target.

In the system thus configured, it is possible to keep monitoring the protection target, using an air vehicle like drone mounted on the vehicle. It is therefore possible to keep monitoring the protection target, even when the protection target is located in a place that the vehicle cannot enter.

Information about a rescue method for each protection target is registered in advance in the server. The server is configured, when a protection target is identified, to rescue the identified protection target in accordance with the information about the rescue method registered for the identified protection target.

In the system thus configured, rescue is performed in accordance with a predetermined rescue method. Therefore, even when instructions cannot be obtained immediately from the family for example of the protection target, the protection target can be protected appropriately by the rescue method accepted by the family in advance.

Information about a protector including a family member of the protection target is registered in the server. The server is configured, when the protection target is identified, to give a notification to the protector.

In the system thus configured, it is possible to immediately inform the requester of the fact that the protection target has been found.

The server is configured to arrange a vehicle for transporting the protection target, in response to an instruction to transport the protection target, from the protector given the notification.

In the system thus configured, it is possible to appropriately protect the protection target, even when a protector for example cannot immediately rush to the location of the protection target.

The server is configured to keep monitoring the protection target, until the protector arrives at a location of the protection target.

In the system thus configured, it is possible to keep monitoring the protection target until the protection target is protected, and thus prevent the system from losing sight of the protection target.

A server according to another aspect of the present disclosure is a server used for a system for identifying a protection target, using information from a plurality of movable bodies each equipped with a camera. The server is configured to communicate with the plurality of movable bodies. The server is configured, when the protection target is identified, to (a) acquire positional information about each of the plurality of movable bodies and positional information about the protection target, and (b) select, as the protection target moves, a movable body which is to monitor the protection target, from the plurality of movable bodies.

A method according to still another aspect of the present disclosure is a rescue method for identifying and rescuing a protection target by a system. The system includes: a plurality of movable bodies each equipped with a camera; and a server configured to communicate with the plurality of movable bodies. The method includes: (a) identifying, by the server, the protection target using information acquired by the camera; (b) acquiring, by the server, positional information about the plurality of movable bodies and positional information about the protection target, when the protection target is identified; and (c) selecting, by the server, a movable body which is to monitor the protection target, from the plurality of movable bodies, as the protection target moves.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
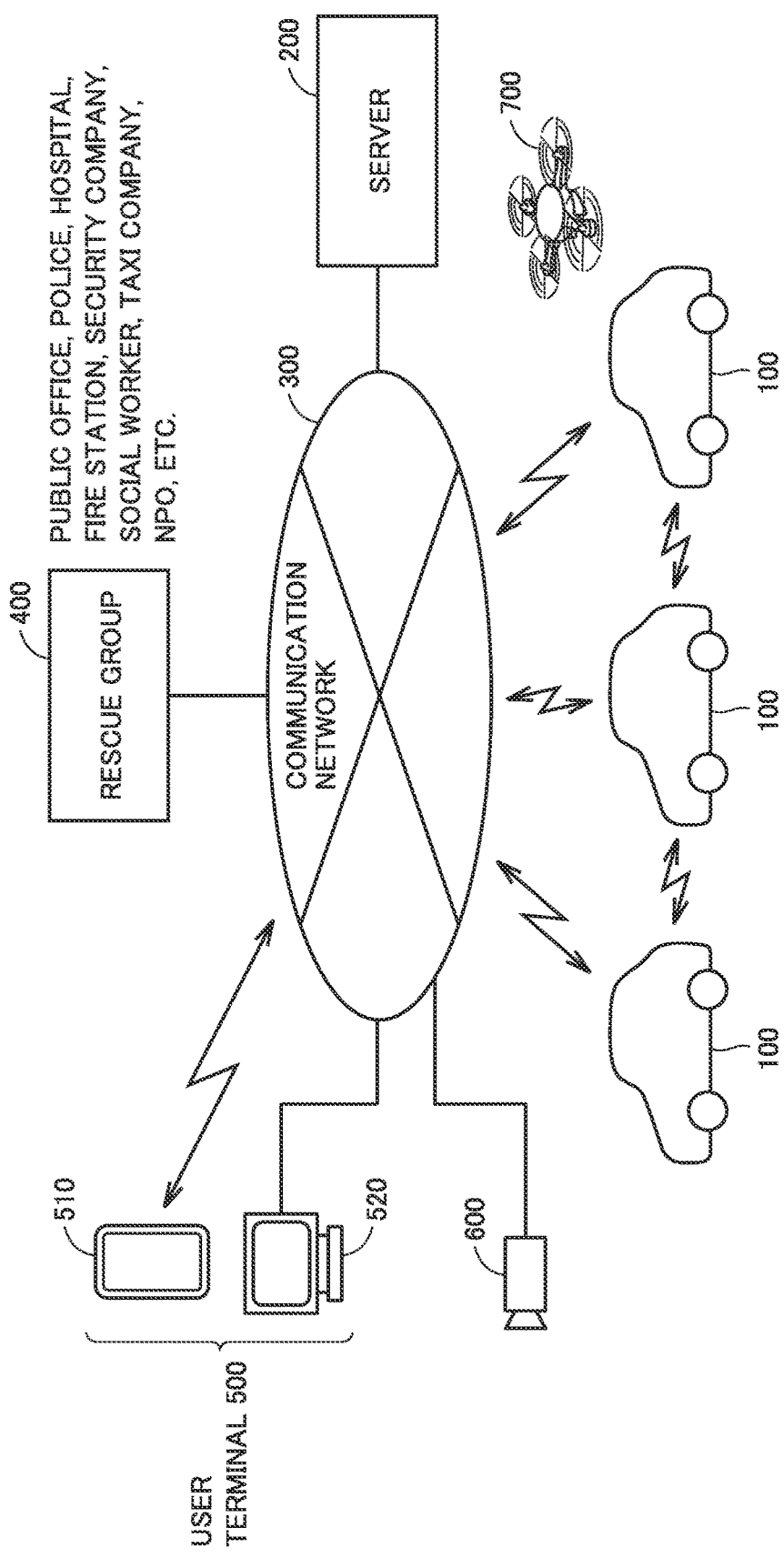
FIG. 1 is a schematic diagram of an overall configuration of a rescue system according to the present embodiment.

In the following, embodiments of the present disclosure are described in detail with reference to the drawings. In the drawings, the same or corresponding elements are denoted by the same reference characters, and a description thereof is not repeated.

First Embodiment

System Overview

FIG. 1 is a schematic diagram of an overall configuration of a rescue system 10 according to the present embodiment.

Referring to FIG. 1, rescue system 10 includes a plurality of movable bodies 100 and a server 200 configured to communicate with movable bodies 100. Rescue system 10 searches for a target person (also referred to as "protection target" hereinafter) at the request of a user, based on information acquired from movable bodies 100.

Regarding the present embodiment, an example is described in which a vehicle is used as movable body 100, and movable body 100 is also referred to simply as "vehicle 100" hereinafter. Vehicle 100 includes automobile, motorcycle, bicycle, and the like.

Vehicle 100 and server 200 are configured to transmit/receive information to/from each other through a communication network 300 such as the Internet or telephone line, for example. Vehicle 100 and server 200 may directly communicate with each other without communication network 300. Vehicles 100 are also capable of directly communicating with each other.

A requester (e.g. family member of or caretaker for a protection target) requests server 200 to search for the protection target, by manipulating a user terminal 500 such as a mobile terminal 510 like smart phone or a personal computer 520 at the requester's home. Server 200 receiving the request acquires information from cameras and/or a variety of sensors mounted on vehicles 100 or a stationary camera 600 installed on a street or shop, and identifies the protection target, using the acquired information.

Some of vehicles 100 are each equipped with an air vehicle 700 capable of automated flight like drone. Air vehicle 700 is equipped with a camera (not shown) and has a function of automatically tracking a specified target based on images captured by the camera. Air vehicle 700 is also configured to transmit the images captured by the camera to server 200 via vehicle 100.

After identifying the protection target, server 200 requests a rescue group 400 to protect the protection target as required. Rescue group 400 includes, for example, a public office such as city office or municipal office, a police, a fire station, a security company, a hospital, a hospice, a care house, an NPO (Non-Profitable Organization), and a public transportation facility such as taxi company, or local social worker. Alternatively, rescue group 400 may be a vehicle or a shop located around the location where the protection target is detected. Rescue group 400 receiving the request temporarily accepts the protection target until the arrival of a protector such as a family member of the protection target, or sends the protection target to a given location such as his/her home.

Configuration of Vehicle and Server

Figure 2:
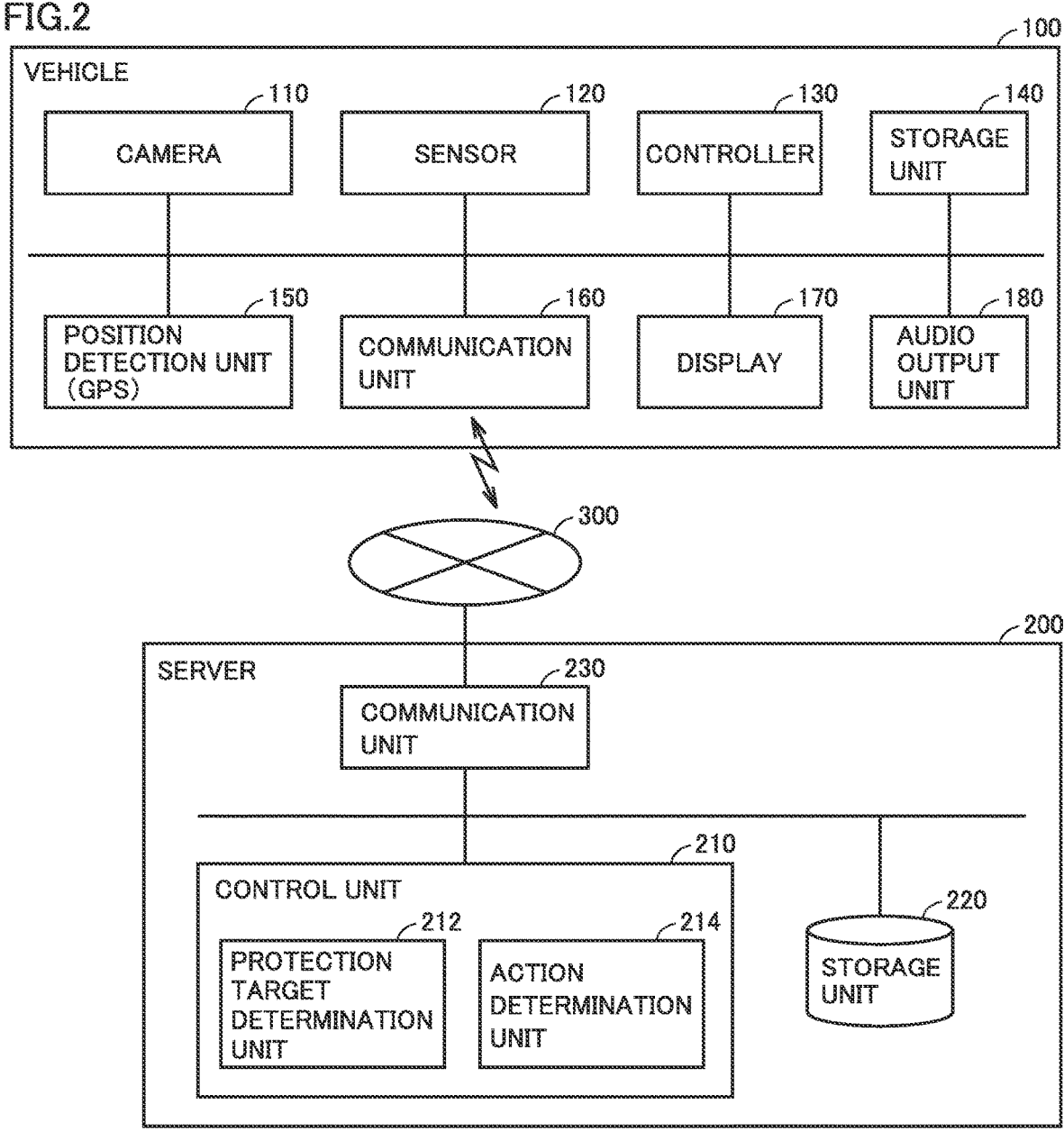
FIG. 2 is a block diagram for illustrating details of a vehicle and a server in FIG. 1.

FIG. 2 is a block diagram for illustrating details of vehicle 100 and server 200 in FIG. 1. Referring to FIG. 2, vehicle 100 includes a camera 110, a sensor 120, a controller 130, a storage unit 140, a position detection unit 150, a communication unit 160, a display 170, and an audio output unit 180.

Communication unit 160 is a communication interface between vehicle 100 and communication network 300. Vehicle 100 transmits/receives information to/from server 200 through communication unit 160. Vehicle 100 is also capable of performing inter-vehicle communication with other vehicles through communication unit 160. Further, when vehicle 100 is equipped with air vehicle 700, communication unit 160 may also be used to communicate with this air vehicle 700.

Camera 110 is a CCD (Charge Coupled Device) camera, for example, and attached to a front portion and/or a rear portion of vehicle 100. Camera 110 is mounted as a part of a drive recorder for recording images and/or video when vehicle 100 suffers an accident or the like, for example. The images captured by camera 110 are transmitted to server 200 through communication unit 160. The images are captured by camera 110 not only during running of vehicle 100 but also during parking of vehicle 100 at a parking area or the like.

Sensor 120 is a receiver for wirelessly detecting information stored on an ID tag or the like, or a reader for reading information from a barcode or QR Code® (two-dimensional barcode), for example. The information acquired by sensor 120 is transmitted to server 200 through communication unit 160 and used for identifying a protection target.

Position detection unit 150 is mounted for example on a navigation device (not shown) to acquire information about the absolute position of the vehicle on which this position detection unit 150 is mounted, by means of the GPS (Global Positioning System). Position detection unit 150 outputs the acquired positional information to server 200.

Figure 3:
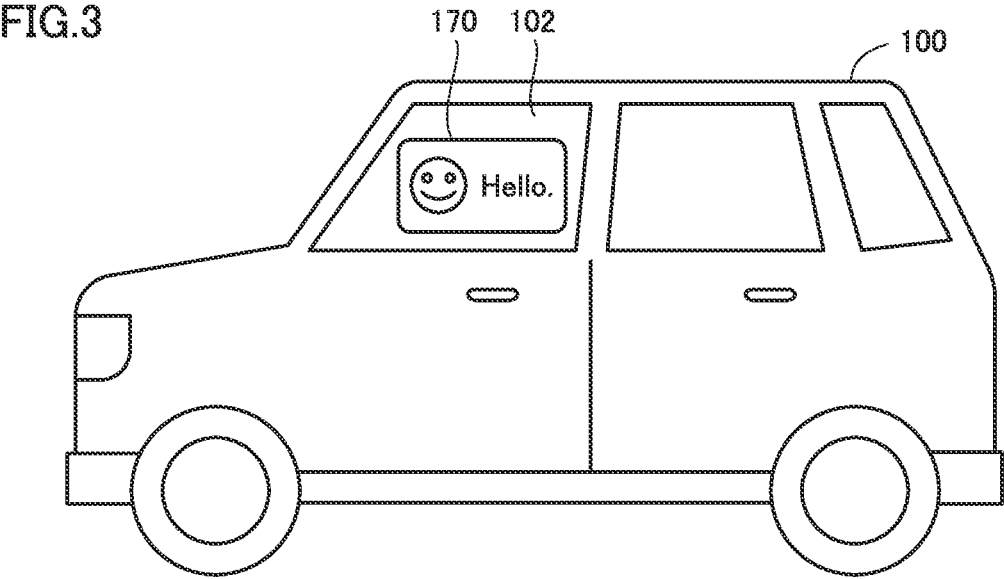
FIG. 3 is a diagram showing an example of a display of the vehicle.

Display 170 is an interface constructed for example of a liquid crystal panel to display various types of information acquired by vehicle 100 as well as information transmitted from server 200. As shown in FIG. 3, display 170 is formed for example in a window 102 of vehicle 100 and configured to provide information to those who are outside the vehicle (protection target, for example). Conversation through audio output unit 180 as well as display 170 like videophone, and communication by answering to a question indicated on display 170 through touch operation are also possible.

Controller 130 includes a CPU (Central Processing Unit), a storage such as memory, and an input/output buffer (they are not shown), to perform overall control of vehicle 100. Receiving from server 200 a command to search for a protection target, controller 130 acquires information from the detection device (camera 110 and/or sensor 120) and transmits the acquired information to server 200. When vehicle 100 is to identify the protection target, controller 130 stores in storage unit 140 information regarding the protection target which is transmitted from server 200, and compares the information acquired from the detection device with the information stored in storage unit 140 to identify the protection target.

Server 200 includes a control unit 210, a storage unit 220, and a communication unit 230. Control unit 210 includes a protection target determination unit 212, and an action determination unit 214.

Communication unit 230 is a communication interface between server 200 and communication network 300. Server 200 transmits/receives information to/from vehicle 100 and rescue group 400 for example through communication unit 230.

Storage unit 220 stores in advance information about characteristics of a protection target for identifying the protection target. The characteristics used for identifying the protection target include text information such as the name, the address, and the phone number of the protection target, image information such as a photograph of the face of the protection target, characteristics of favorite clothing and belongings (hat/cap, gloves, shoes, bag, and the like) often worn by the protection target, or information about characteristic behavioral patterns of the protection target such as the manner of walking and body language. In storage unit 220, information about a protector such as a family member of or a caretaker for the protection target is also registered.

Protection target determination unit 212 included in control unit 210 receives image information acquired by camera 110 of vehicle 100 and/or information acquired by sensor 120. Protection target determination unit 212 analyzes the image information from camera 110 to detect characteristics of the face, clothing, and belongings of any person (candidate) included in the image and extract text information included in the image. Protection target determination unit 212 compares these pieces of information with the information stored in storage unit 140 to determine whether the candidate included in the image is the protection target who is being searched for by request. Protection target determination unit 212 may also compare the ID information extracted by sensor 120 with the information stored in storage unit 140 to identify the protection target. It may also extract, from the image (moving image) from camera 110, behavioral patterns of the candidate by big data analysis, so as to identify the protection target.

Action determination unit 214 determines what action is to be taken, when protection target determination unit 212 identifies the protection target. Specifically, action determination unit 214 determines whether to inform the search requester (protector) of the fact that the protection target has been found, and determines whether to make a rescue request to a rescue group, in accordance with standards stored in storage unit 220.

In such a system, some of vehicles conducting search are stopping and some are running. As for the stopping vehicle, the field of view of the camera of the vehicle is unchanging, and therefore, the protection target who moves may go out of the field of view of the camera. As for the running vehicle, the vehicle itself is moving, and therefore, the protection target who is stationary in position may also go out of the field of view of the camera. Accordingly, even when the protection target is found, the system may not be able to appropriately keep monitoring the protection target and eventually lose sight of the protection target.

In view of the above, the present embodiment employs the following scheme. Specifically, when the protection target is identified, a vehicle which is to monitor the protection target is selected appropriately as the protection target moves, based on the positional information about the protection target and the positional information about vehicles located around the protection target. Even when the found protection target moves out of the field of view of the camera of a certain vehicle, the system configured in this way can appropriately designate another vehicle to take over monitoring of the protection target.

Description of Control Details

Figure 4:
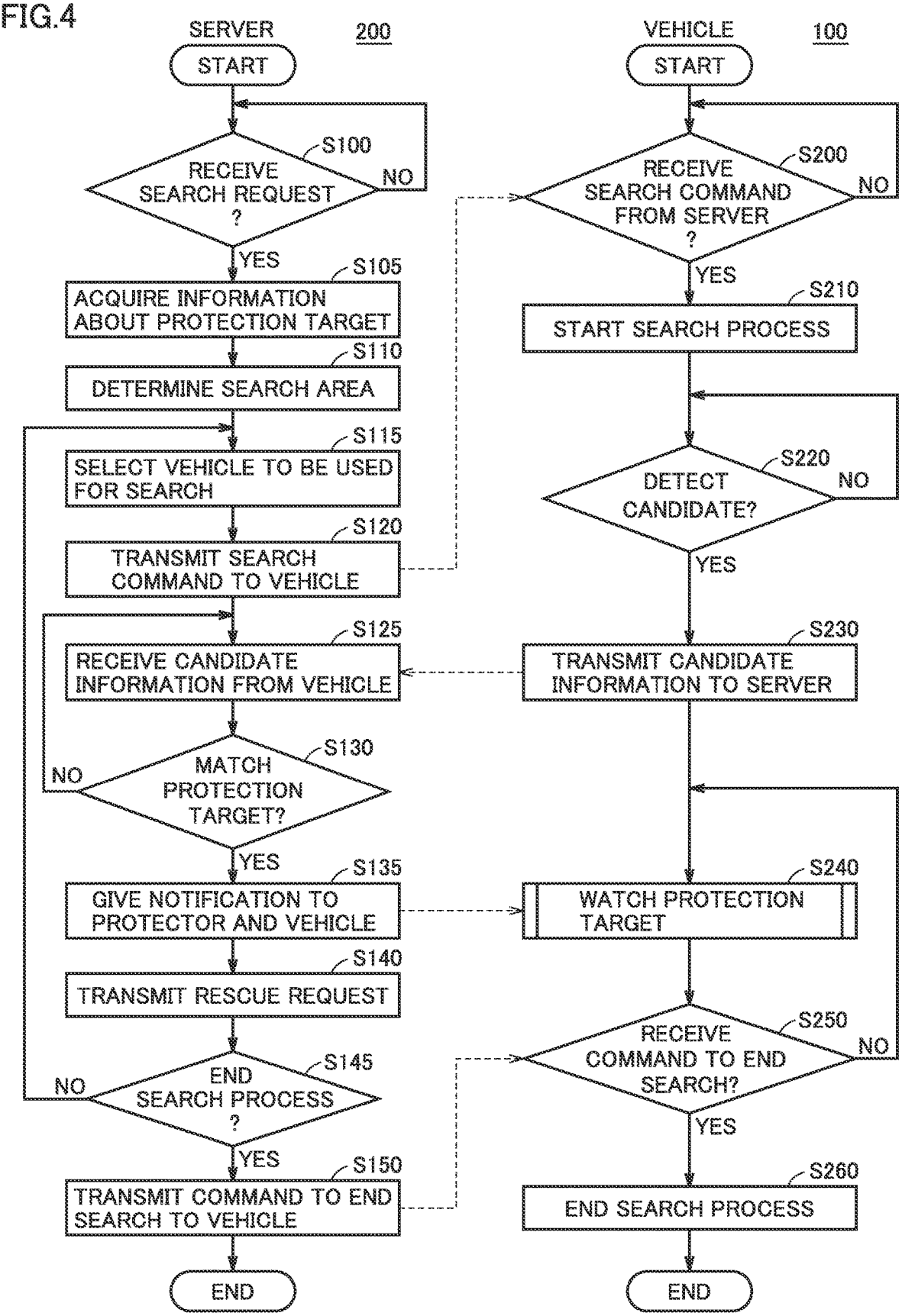
FIG. 4 is a flowchart for illustrating details of control executed by a vehicle and a server for a rescue system according to a first embodiment.

FIG. 4 is a flowchart for illustrating details of control executed by vehicle 100 and server 200 in rescue system 10 according to the first embodiment. Each of the flowcharts shown in FIG. 4 and FIGS. 5 to 7 described later herein is executed by calling from a main routine a program stored in controller 130 of vehicle 100 and control unit 210 of server 200 in a predetermined cycle or when a predetermined condition is met. Alternatively, a part or all of the steps in each flowchart may be performed by dedicated hardware (electronic circuit).

Referring to FIG. 4, a process performed by server 200 is described first. Server 200 determines, in step (hereinafter step is abbreviated as S) 100, whether a request to search for a protection target is made by a requester. When a request to search is not made by a requester (NO in S100), the process returns to S100. When a request to search is made by a requester (YES in S100), the process proceeds to S105 in which server 200 acquires from storage unit 220 information about the protection target to be searched for by request. The information about the protection target is not limited to the information registered in storage unit 220 in advance, but may be information given together with the request made by the requester, such as specific characteristics of clothing and belongings worn by the protection target on the day the request is made, for example.

Acquiring information about the protection target, server 200 proceeds to S110 to define a search area to be searched for the protection target. The search area is preferably defined based on the usual range of activities of the protection target. The search area may be defined based on the address of the protection target, such as an area of 20 km from the protection target's home, for example, or the search area may be within a range designated by the requester.

In S115, server 200 acquires positional information about a plurality of vehicles through communication network 300. From among vehicles located within the defined search area, at least one vehicle is selected to be used for the search for the protection target. In S115, server 200 outputs a search command to selected vehicle 100 to search for the protection target. Although not shown in the flowchart, if the selected vehicle moves to go out of the search area or a new vehicle enters the search area, the vehicle to be used for search may be changed as appropriate.

Acquiring information about a candidate from selected vehicle 100 to which the search command is output (S125), server 200 determines whether the candidate is identified as the protection target of the requested search, based on the information acquired from vehicle 100 (S130).

When the candidate is not the protection target (NO in S130), the process returns to S125 in which server 200 further acquires information from the aforementioned or another vehicle 100 and further compares the acquired information with the information about the protection target (S130).

When the candidate is the protection target (YES in S130), server 200 informs, in step S135, the protector of the fact that the protection target of the requested search has been found, and informs each vehicle 100 conducting the search of the information about the location where the protection target was found and the latest information about characteristics of the protection target, for example. In response, each vehicle 100 watches the found protection target (S240).

In S140, server 200 transmits a command to protect (request for rescue) to rescue group 400 such as a security company or a police office near the location where the protection target was found. Receiving the request for rescue, the rescue group dispatches, as required, a protection target in charge to the location indicated by the positional information about the protection target transmitted from server 200. In this way, even under situations where the requester cannot immediately rush to the location where the protection target was found, the requester can request the rescue group to rescue the found protection target, so that the protection target may be appropriately protected.

After this, in S145, server 200 determines whether the requester or an administrator of server 200 has instructed server 200 to end the search process. When the instruction to end the search process has not been given (NO in S145), the process proceeds to S115 in which server 200 keeps searching for and watching the protection target. At this time, in S115, server 200 acquires again the positional information about the protection target as well as the positional information about each vehicle 100. When it is recognized that the protection target has moved/is moving, the vehicle to be used for watching is changed appropriately based on the positional information about the protection target and the vehicle.

When the instruction to end the search process is given (YES in S145), the process proceeds to S150 in which server 200 transmits to each vehicle a command to end the search. The command to end the search in S150 may be issued based on information indicating that protection of the protection target is completed which is given from rescue group 400.

Next, a process performed by vehicle 100 is described. While FIG. 4 shows the process performed by a single vehicle 100, the following process is performed by each of selected vehicles when server 200 selects these vehicles as vehicles which are to conduct the search.

In S200, vehicle 100 determines whether the vehicle has received from server 200 a command to search for a protection target, i.e., whether the vehicle itself has been selected as a vehicle for searching for the protection target. When the vehicle has not received from server 200 the command to search (NO in S200), the process returns to S200 and the search process is kept on standby until the command to search is given from server 200.

When the vehicle has received the command to search (YES in S200), the process proceeds to S210 in which vehicle 100 starts the search process. As described above with reference to FIG. 2, vehicle 100 determines, based on the information acquired by camera 110 and/or sensor 120, whether a person who is a candidate of the protection target has been detected (S220). According to the first embodiment, server 200 identifies the protection target, and therefore, vehicle 100 determines the candidate based on general characteristics such as the rough size (height) of the detected person, and the color of the clothing and/or the kinds of belongings worn by the person, for example.

When no candidate is detected (NO in S220), the process returns to S220 and vehicle 100 continues the search for a candidate. When the candidate is detected (YES in S220), the process proceeds to S230 in which vehicle 100 transmits to server 200 information acquired by camera 110 and/or sensor 120.

Receiving the information that server 200 has identified the protection target based on the information from vehicle 100, vehicle 100 acquires from server 200, in S240, information about the location where the protection target was detected and information about characteristics of the protection target at the time when the protection target was detected, for example, and watches the protection target based on the acquired information. Watching of the protection target is, for example, tracking of the identified protection target by this vehicle or other vehicles around the former vehicle. Thus, the identified protection target is kept being watched and accordingly the system can be prevented from losing sight of the protection target.

Figure 5:
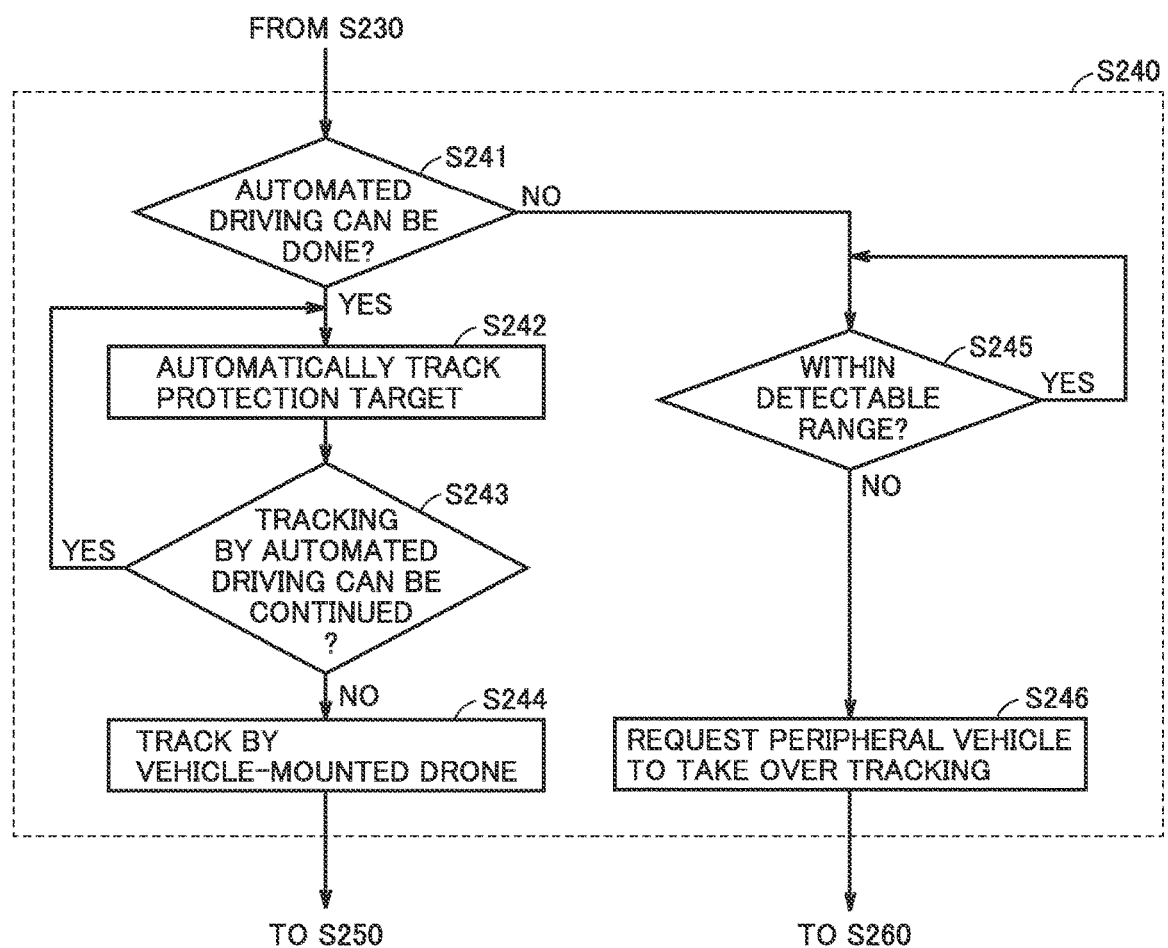
FIG. 5 is a diagram showing details of an operation performed in step S240 in FIG. 4.

FIG. 5 is a flowchart for illustrating details of the operation in step S240 of FIG. 4 for watching the protection target. Referring to FIG. 5, when vehicle 100 receives from server 200 the notification that the protection target has been identified (S135 in FIG. 4), vehicle 100 determines in S241 whether the vehicle itself has an automated driving function and whether the automated driving function can be performed at present. Such a vehicle is typically a rental car or sharing car having an automated deadheading function, for example. Such a vehicle may also be a privately owned vehicle allowed to be rented to the public while not in use by the owner.

When the vehicle can perform the automated driving function (YES in S241), the process proceeds to S242 in which vehicle 100 tracks the identified protection target while performing the automated driving function. At this time, the conditions/surroundings of the protection target may be confirmed by speaking to the protection target through display 170 formed in window 102 of vehicle 100 as shown in FIG. 3, and/or the videophone function may be used to encourage the protection target to have a conversation with the protector (family member) of the protection target or with a protection target in charge belonging to a rescue group, and/or necessary instructions and/or information may be provided to guide the protection target to a safe place. When an immediate action is required, vehicle 100 may ask a driver of another peripheral vehicle or a passerby to protect the protection target.

In S243, vehicle 100 determines whether the vehicle can keep tracking the protection target by the automated driving. For example, vehicle 100 determines that it cannot keep tracking the protection target, when the protection target enters a site (e.g. park, building, one-way road) that vehicle 100 cannot enter, or when vehicle 100 cannot proceed due to a traffic jam or an obstacle, or when vehicle 100 is to be used by the owner, for example. When the vehicle can keep tracking the protection target (YES in S243), the process proceeds to S242 and the vehicle keeps tracking the protection target while performing the automated driving function.

When the vehicle cannot keep tracking the protection target (NO in S243), the process proceeds to S244. When the vehicle is equipped with air vehicle 700 like drone, air vehicle 700 is flown to continue the tracking of the protection target. When vehicle 100 is not equipped with air vehicle 700 or vehicle 100 is to be used by the owner, for example, step S244 may be skipped. Then, the process proceeds to S250.

When vehicle 100 cannot perform the automated driving function (NO in S241), the process proceeds to S245 in which it is determined whether the protection target is detected within a detectable range of camera 110 of vehicle 100 at the current position. When the protection target is within the detectable range of camera 110 (YES in S245), the process returns to S245 and vehicle 100 keeps monitoring the protection target.

When the protection target goes out of the detectable range of camera 110 (NO in S245), the process proceeds to S246 in which vehicle 100 uses inter-vehicle communication to transmit, to a peripheral vehicle, a request to take over tracking of the protection target. As to the determination in S245, not only when the protection target has gone completely out of the field of view of camera 110 but also when the protection target who is detected at an outer edge of the field of view is nearly going out of the field of view, it may be determined that the protection target is out of the detectable range. After the operation in S246 is performed, the process proceeds to S260 (FIG. 4).

In S246, inter-vehicle communication is used to request a vehicle to take over monitoring of the protection target. The vehicle which is to take over monitoring may be selected by server 200 based on the positional information about the protection target and the positional information about vehicle 100 as described above. Server 200 acquires the positional information about peripheral vehicles as appropriate. Therefore, server 200 may predict the direction in which the protection target moves, and select another vehicle located in the predicted direction of movement to instruct the selected vehicle to take over tracking of the protection target, for example.

Vehicle 100 thereafter determines, in S250, whether server 200 has transmitted a command to end the search for the protection target. When vehicle 100 has not received the command to end the search (NO in S250), the process returns to S240 in which the watching of the protection target is continued. If the protection target goes out of the field of view of camera 110, for example, the process may return to S220 in which the search for a candidate may be newly performed.

Referring again to FIG. 4, when vehicle 100 has received the command to end the search (YES in S250), the process proceeds to S260 and vehicle 100 accordingly ends the search process.

Although not shown in FIG. 4, when server 200 could not identify the protection target, vehicle 100 returns the process to S220 to continue the search for another candidate.

Under control performed in accordance with the process as described above, when the rescue system identifies the protection target, the vehicle detecting the protection target keeps monitoring the protection target. When the protection target moves and accordingly the originally selected vehicle can no more keep monitoring the protection target, the vehicle performing the monitoring is changed appropriately. In this way, the system can keep monitoring the identified protection target, without losing sight of the protection target.

Second Embodiment

The above description of the first embodiment relates to an example in which the recognition and identification of a protection target are performed by the server. As described above, the server stores a large amount of information. In addition, a controller with a high throughput is used for the server. The server can therefore make determinations with higher accuracy for the recognition and identification of a protection target.

If the number of vehicles used for conducting a search for a target person increases, the total amount of information transmitted and received to/from the vehicles and the server increases, which may result in increase of the time taken for communication and/or increase of the processing load on the server, for example.

Regarding a second embodiment, a scheme is described according to which a specific part or the whole of the recognition and identification of a protection target is performed by the controller in the vehicle so as to reduce the amount of communication between the vehicles and the server and reduce the processing load on the server.

Figure 6:
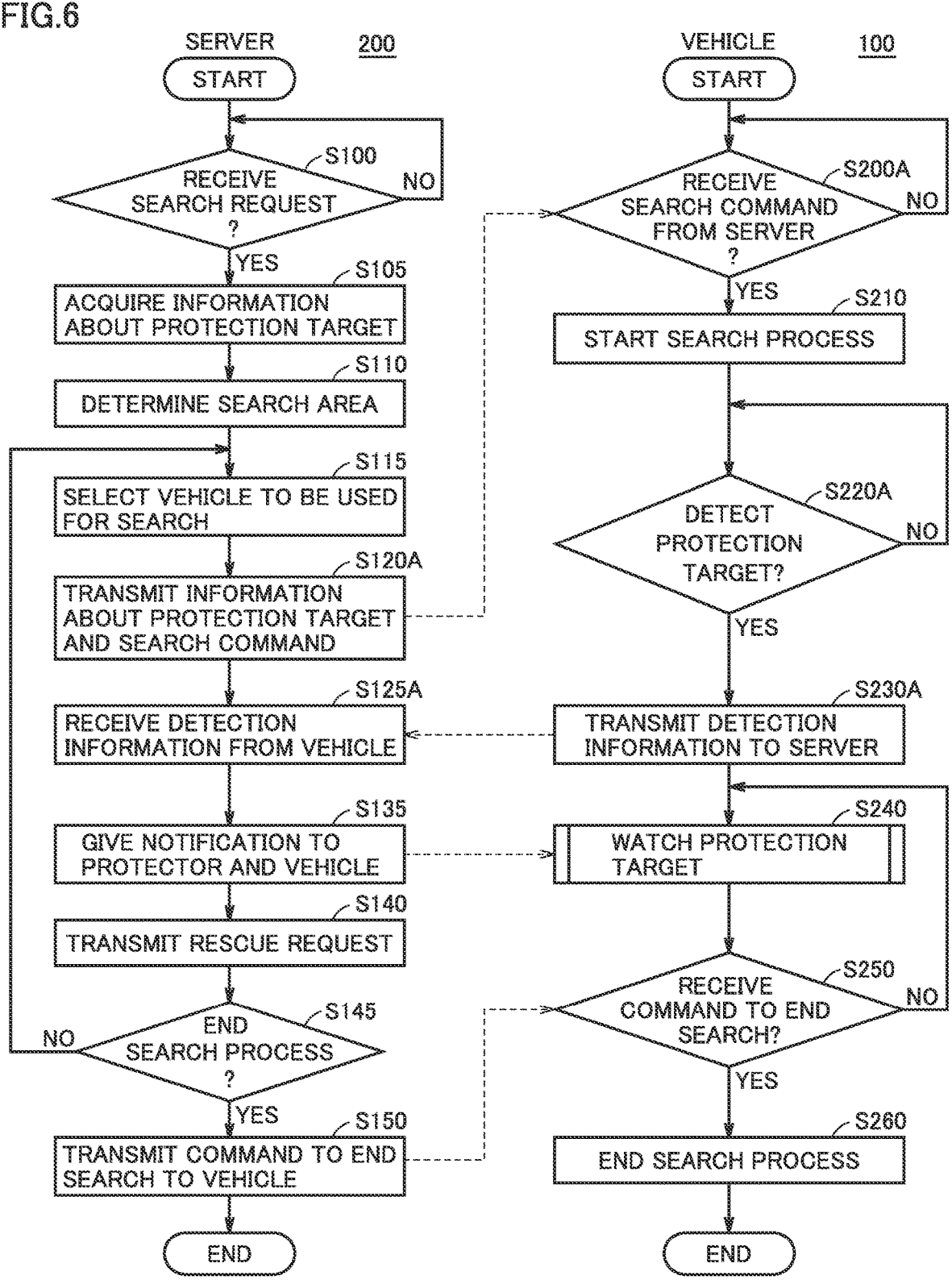
FIG. 6 is a flowchart for illustrating details of control executed by a vehicle and a server for a rescue system according to a second embodiment.

FIG. 6 is a flowchart for illustrating details of control executed by vehicle 100 and server 200 of rescue system 10 according to the second embodiment. Steps S120, S125, S200, S220, and S230 of the flowchart in FIG. 4 are replaced with 5120A, S125A, S200A, S220A, and S230A, respectively, in FIG. 6, and FIG. 6 does not include step S130 of FIG. 4. The description of those steps in FIG. 6 which are also included in FIG. 4 is not repeated.

Referring to FIG. 6, server 200 selects a vehicle to be used for conducting the search in S115, and then transmits to selected vehicle 100 information for identifying the protection target, together with a command to search in S120A.

Receiving, in S200A, the command to search and the information about the protection target transmitted from server 200, vehicle 100 starts the search for the protection target, following the command to search (S210). Then, in S220A, based on the information received from server 200 for identifying the protection target, vehicle 100 identifies the protection target, from the information acquired by camera 110 or sensor 120.

The throughput of the controller and the storage capacity of the storage device mounted on vehicle 100 are commonly inferior to those of server 200. Therefore, the process for identifying the protection target that is performed by vehicle 100 is preferably limited to a scheme that enables the process to be performed with a relatively low processing load, rather than a scheme which requires a high throughput like use of big data, for example. For example, the process for reading ID information by sensor 120 or the process for extracting text information from images captured by camera 110, for example, so as to identify the protection target, are examples of the process that is executable by vehicle 100.

When vehicle 100 has identified the protection target, vehicle 100 transmits to server 200 detection information of the protection target. When server 200 performs a part of the process for identifying the protection target, vehicle 100 additionally transmits, in S230A, information necessary for the process to be performed by server 200.

Receiving from vehicle 100 the detection information of the protection target (S125A), server 200 gives the protector a notification that the protection target has been found (S135), and makes a rescue request to rescue group 400 to rescue the protection target, based on the detection information (S140). Although not shown in FIG. 6, when server 200 also performs a part of the process for identifying the protection target, server 200 performs an operation corresponding to step S130 in FIG. 4.

Control performed in accordance with the process as described above enables the vehicle to execute at least a part of the recognition and identification of the protection target. Accordingly, monitoring of the protection target can be continued as in the first embodiment, and additionally, the protection target can be searched for efficiently with a reduced amount of communication between the vehicle and the server and a reduced processing load on the server.

Third Embodiment

According to the first and second embodiments, the finding of the protection target is always followed by a rescue request given to a rescue group. In some cases, the protection target may perform an ordinary activity such as walking or shopping, for example. If the request to rescue is given to the rescue group in such a case as well, call-outs may be made more than necessary to a person in charge, for example, which leads to inefficiency.

Regarding a third embodiment, a description is given of the features that a protection level for the detected protection target is determined depending on the situation or condition of the protection target at the time of detection, and whether to make a request to rescue is determined based on the protection level. More specifically, server 200 determines, by action determination unit 214 in FIG. 2, the protection level for the protection target, based on information from vehicle 100, and determines an action to be executed, based on a comparison between the protection level and standards stored in storage unit 220.

The protection level is determined based on at least one of the location where the protection target was detected, the time when the protection target was detected, the weather when the protection target was detected, and the condition of the protection target, for example. More specifically, as to the location where the protection target was detected, the protection level is determined based on the distance from a location of heavy traffic, or from a location where accidents are more likely to occur such as river and pond. As to the time when the protection target was detected, the protection level is determined based on whether it was daytime, nighttime, or midnight, for example. As to the weather when the protection target was detected, the protection level is determined based on rainfall, snowfall, wind velocity, and issuance of weather warning or alert, for example. As to the behavioral patterns of the protection target, the protection level is determined based on whether the manner of walking is that of a drunken protection target and/or any characteristic habit of the protection target, for example.

The rescue method to be performed may be determined in accordance with instructions given from the protector when contact is made with the protector. For example, when the protector wishes that the protection target be transported by a vehicle, server 200 makes contact with a security company or taxi company for example to arrange a vehicle for transporting the protection target. Server 200 may command a vehicle capable of automated driving to head for the protection target by unmanned driving. At this time, the arranged vehicle may pick up the protector and then head for the location where the protection target under monitoring is located. In this case, preferably vehicle 100 keeps monitoring the protection target until the protector arrives at the location of the protection target.

Figure 7:
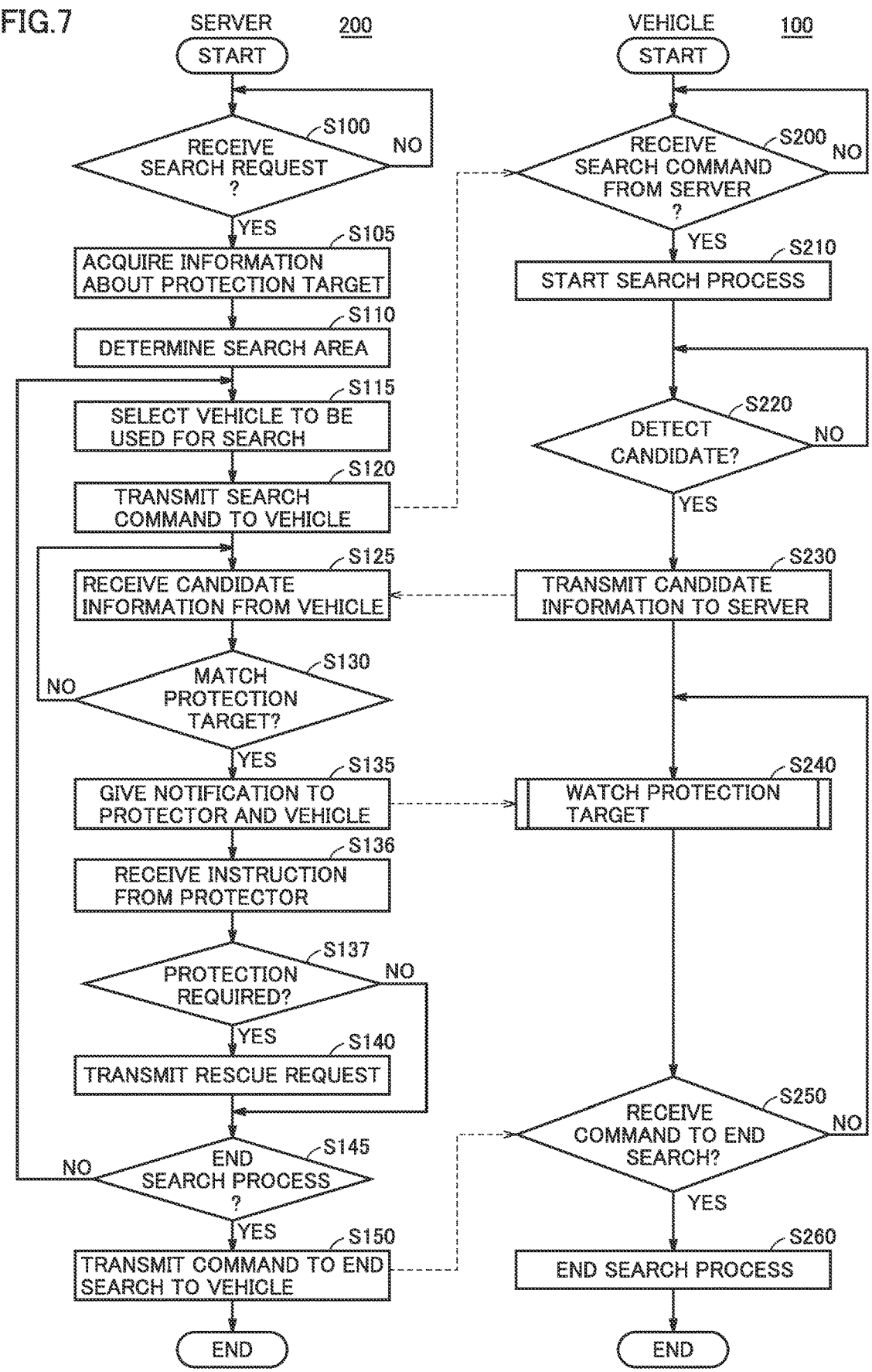
FIG. 7 is a flowchart for illustrating details of control executed by a vehicle and a server for a rescue system according to a third embodiment.

FIG. 7 is a flowchart for illustrating details of control executed by vehicle 100 and server 200 of rescue system 10 according to the third embodiment. FIG. 7 includes steps S136 and S137 in addition to the steps of the flowchart in FIG. 4. The description of those steps in FIG. 7 which are also included in FIG. 4 is not repeated.

Referring to FIG. 7, server 200 identifies the protection target, based on information from vehicle 100 (S130), provides the protector and vehicle 100 with a notification that the protection target has been identified (S135), and determines the protection level (S136) based on the environment and the condition of the protection target, at the time when the protection target was detected, and based on the information given from vehicle 100. If the protection target is in an environment where the possibility that the protection target encounters danger is high, the protection level is set to a high level. When the found protection target is down or performs a strange behavior for example as well, for example, the protection level is set to a high level. The protection level is determined based on a combination of multiple conditions as described above, and set to one of five levels, for example.

When specific instructions are given from the protector as well, the protection level may be set to a high level and the rescue method specified by the protector may be given priority and performed. The instructions given from the protector may be instructions concerning the rescue method given from the protector when contact is made with the protector in S135, or a rescue method registered in advance in storage unit 220.

After the protection level is determined, server 200 compares the determined protection level with a preset threshold value to determine whether it is necessary to protect (rescue) the protection target in S137. When the protection level is set to one of five levels, it is determined that rescue of the protection target is necessary when the protection level is "4" or higher, for example.

When rescue is necessary (YES in S137), the process proceeds to S140 in which a request to rescue is transmitted from server 200 to rescue group 400. When rescue is not necessary (NO in S137), server 200 continues the search and watching of the protection target.

Under control performed in accordance with the process as described above, it is determined whether to request the rescue group to rescue the protection target, based on the environment and/or the condition of the protection target when the protection target was detected, as well as instructions from the protector. Accordingly, an inappropriate rescue request to the rescue group or unnecessary call-out to a protection target in charge can be prevented.

Fourth Embodiment

According to the above description of the first to third embodiments, a search is started in response to a request, from a requester, to search for a specific protection target.

Regarding a fourth embodiment, a scheme is described according to which when a running or stopping vehicle detects a possible candidate, the vehicle detecting the candidate voluntarily makes an inquiry to the server, even when a search request has not been given from a requester.

Figure 8:
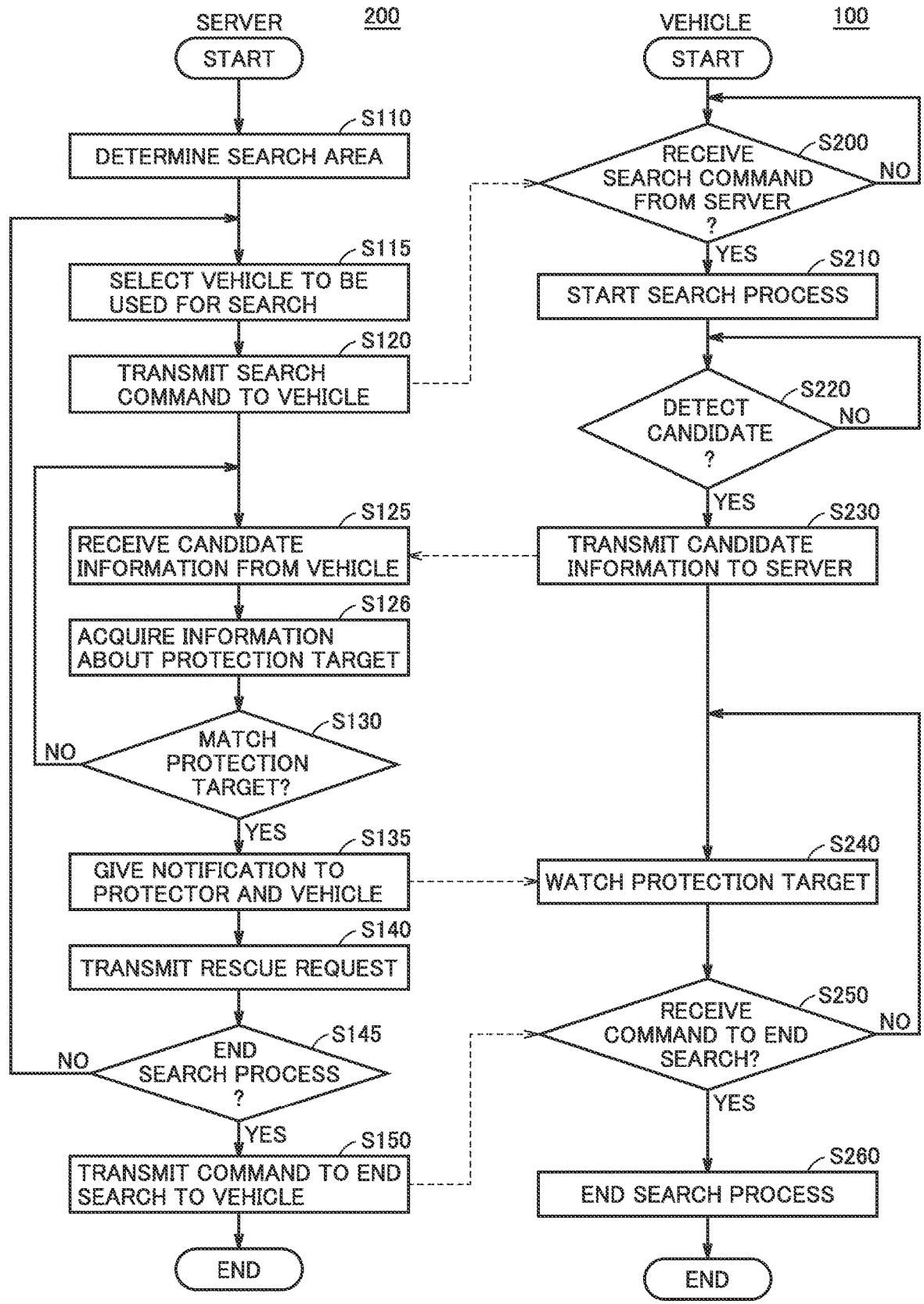
FIG. 8 is a flowchart for illustrating details of control executed by a vehicle and a server for a rescue system according to a fourth embodiment.

FIG. 8 is a flowchart for illustrating details of control executed by vehicle 100 and server 200 of rescue system 10 according to the fourth embodiment. In FIG. 8, steps S100 and S105 of the flowchart in FIG. 4 are not included and step S126 is additionally included. The description of those steps in FIG. 8 which are also included in FIG. 4 is not repeated.

Referring to FIG. 8, in order to conduct patrol to find whether a protection target who needs protection is present or not, even when no search request has been given from a requester, server 200 appropriately selects a vehicle located within a specific search area and outputs a command to search (S110-S120). Receiving the command to search from server 200, vehicle 100 detects a candidate to be protected, based on information acquired from camera 110 and sensor 120, and transmits to server 200 the detection information that the candidate has been detected (S200-S230).

Receiving the detection information from vehicle 100 (S125), server 200 acquires from storage unit 220 information about a registered protection target (S126). In S130, server 200 checks the detection information from vehicle 100 against the registered information from storage unit 220 to determine whether the candidate detected by vehicle 100 is the protection target who is registered in advance. When the candidate is the protection target (YES in S130), server 200 gives a notification to a protector of the protection target (S135) and makes a rescue request to rescue group 400 as required.

Under control performed in accordance with the process as described above, a vehicle located in a predetermined area conducts patrol to find whether a protection target is present or not, even when no search request has been given from a requester. For example, even when a protector of a protection target who is registered in advance is not aware of the fact that the protection target is absent without leave, the protection target can be found in an early stage and occurrence of an accident can be prevented. The above-described first to fourth embodiments may be combined as appropriate within the range that causes no inconsistency.

MODIFICATIONS

According to the above description of each embodiment, a vehicle is used as movable body 100. Movable body 100, however, may represent a concept including human or animal. For example, as the camera mounted on the movable body in the above description, a mobile terminal (smart phone or the like) having the photography function or a wearable camera which is wearable on a human/animal body may also be used. If the movable body is a human, the movable body is not limited to those who are experts in search, but images taken by an ordinary person who is taking a stroll, jogging, or walking may be transmitted to server 200.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A rescue system for identifying and rescuing a protection target person, using image information from cameras, the rescue system comprising:
    a plurality of movable bodies each equipped with a camera; and
    a server configured to communicate with the plurality of movable bodies, wherein
    each of the plurality of movable bodies is configured to store the image information acquired by the camera it has equipped; and
    the server is configured to
        identify the protection target person by comparing the image information acquired by the each equipped camera with candidate information,
    when the protection target person is identified,
        acquire positional information about each of the plurality of movable bodies and positional information about the protection target person, and
        select, as the protection target person moves, a movable body which is to monitor the protection target person, from the plurality of movable bodies in order to continuously monitor the protection target person,
    wherein the candidate information comprises image information including a photograph of a face, characteristics of favorite clothing and belongings, or about characteristic behavioral patterns of the protection target person,
        the plurality of movable bodies include a first movable body and a second movable body, and
        the server is configured, while the first movable body is monitoring the protection target person, to
            predict a moving direction in which the protection target person moves, from the positional information about the protection target person, and
            switch the movable body to be used for monitoring the protection target person, from the first movable body to the second movable body, when the second movable body is located in the predicted moving direction.

2. The rescue system according to claim 1, wherein
the plurality of movable bodies include a vehicle configured to perform automated driving, and
the vehicle is configured, when the vehicle detects the protection target person, to track the protection target person by automated driving, as the protection target person moves.

3. The rescue system according to claim 2, wherein
the vehicle comprises a display formed in a window of the vehicle, and
the vehicle is configured to provide information to the protection target person through the display while the vehicle is tracking the protection target person by automated driving.

4. The rescue system according to claim 3, wherein
the display is configured to serve as an interface enabling a protector of the protection target person to make a conversation with the protection target person, while the vehicle is tracking the protection target person.

5. The rescue system according to claim 2, wherein
the vehicle is provided with an air vehicle equipped with a camera and capable of automated flight, and
when the protection target person enters an area in which the vehicle cannot track the protection target person while the vehicle is tracking the protection target person, the vehicle actuates the air vehicle and the air vehicle takes over monitoring of the protection target person.

6. The rescue system according to claim 1, wherein
information about a rescue method for each protection target person is registered in advance in the server, and
the server is configured, when a protection target person is identified, to rescue the identified protection target person in accordance with the information about the rescue method registered for the identified protection target person.

7. The rescue system according to claim 1, wherein
information about a protector including a family member of the protection target person is registered in the server, and
the server is configured, when the protection target person is identified, to give a notification to the protector.

8. The rescue system according to claim 7, wherein
the server is configured to arrange a vehicle for transporting the protection target person, in response to an instruction to transport the protection target person, from the protector given the notification.

9. The rescue system according to claim 7, wherein
the server is configured to keep monitoring the protection target person, until the protector arrives at a location of the protection target person.

10. A server used for a system for identifying a protection target person, using image information from a plurality of movable bodies each equipped with a camera, wherein
each of the plurality of movable bodies is configured to store the image information acquired by the camera it has equipped; the plurality of movable bodies including a first movable body and a second movable body, and
the server is configured to
    to identify the protection target person by comparing the image information acquired by the each equipped camera with candidate information,
when the protection target person is identified,
acquire positional information about each of the plurality of movable bodies and positional information about the protection target person, and
select, as the protection target person moves, a movable body which is to monitor the protection target person, from the plurality of movable bodies in order to continuously monitor the protection target person,
    wherein the candidate information comprises image information including a photograph of a face, characteristics of favorite clothing and belongings, or about characteristic behavioral patterns of the protection target person,
        the server is configured, while the first movable body is monitoring the protection target person, to
            predict a moving direction in which the protection target person moves, from the positional information about the protection target person, and
            switch the movable body to be used for monitoring the protection target person, from the first movable body to the second movable body, when the second movable body is located in the predicted moving direction.

11. A rescue method for identifying and rescuing a protection target person by a system, the system comprising:
   a plurality of movable bodies each equipped with a camera;
   each of the plurality of movable bodies is configured to store image information acquired by the camera it has equipped; and
   a server configured to communicate with the plurality of movable bodies, wherein
      the plurality of movable bodies include a first movable body and a second movable body,
   the rescue method comprising:
   identifying, by the server, the protection target person by comparing the image information acquired by the each equipped camera with candidate information;
   acquiring, by the server, positional information about the plurality of movable bodies and positional information about the protection target person, when the protection target person is identified; and
   selecting, by the server, a movable body which is to monitor the protection target person, from the plurality of movable bodies, as the protection target person moves in order to continuously monitor the protection target person,
   while the first movable body is monitoring the protection target person,
      predicting, by the server, a moving direction in which the protection target person moves, from the positional information about the protection target person, and
      switching, by the server, the movable body to be used for monitoring the protection target person, from the first movable body to the second movable body, when the second movable body is located in the predicted moving direction
   wherein the candidate information comprises image information including a photograph of a face, characteristics of favorite clothing and belongings, or about characteristic behavioral patterns of the protection target person.

* * * * *